(12) United States Patent
Van Kooten

(10) Patent No.: US 12,722,555 B1
(45) Date of Patent: Sep. 1, 2026

(54) TRAILER AND DUMPSTER

(71) Applicant: John C. Van Kooten, Glenview, IL (US)

(72) Inventor: John C. Van Kooten, Glenview, IL (US)

( * ) Notice: Subject to any disclaimer, the term of this patent is extended or adjusted under 35 U.S.C. 154(b) by 0 days.

(21) Appl. No.: 19/571,283

(22) Filed: Mar. 18, 2026

(51) Int. Cl.
*B60P 1/28* (2006.01)
*B60P 1/14* (2006.01)
*B62D 63/06* (2006.01)

(52) U.S. Cl.
CPC ................. *B60P 1/283* (2013.01); *B60P 1/14* (2013.01); *B62D 63/062* (2013.01)

(58) Field of Classification Search
CPC .. B62D 63/061; B60P 1/28; B60P 1/14; B60P 1/283
See application file for complete search history.

(56) References Cited

U.S. PATENT DOCUMENTS 2,943,583 A 7/1960 Ryan
3,082,891 A 3/1963 Hessler
3,335,885 A * 8/1967 Livingston ................ B60P 1/14 414/421
5,447,361 A * 9/1995 Phillips ..................... B60P 1/64 298/1 A
8,177,304 B2 5/2012 Rogers
8,662,598 B1 * 3/2014 Lores ........................ B60P 1/14 414/495
2006/0033378 A1 * 2/2006 Sargent ................ B62D 63/062 298/6
2020/0391642 A1 * 12/2020 Brown ................. B60K 7/0007

FOREIGN PATENT DOCUMENTS

EP 0070663 A2 * 1/1983 ................ B60P 1/14
EP 2774809 A1 * 9/2014 ................ B60P 1/14
NL 1010738 C2 * 6/2000 ........... B62D 63/061

OTHER PUBLICATIONS

"Lugger Trailer," protainer.com. https://protainer.com/product/geneva-lugger-trailer/ [Date accessed: Jan. 27, 2021].
"MUTS ATV Dump Trailer 2000-Pound—Heavy Duty Steel ATV Tow Tandem Axle Cart—Winch Operated Lift," amazon.com. https://www.amazon.com/MUTS-ATV-Dump-Trailer-2000-Pound/dp/B076Y5QS6S/ref=sr_1_45?ie=UTF8&qid=1513121913&sr=8-45&keywords=atv+trailer [Date accessed: Jan. 27, 2021].

* cited by examiner

*Primary Examiner* — Kaitlin S Joerger
(74) *Attorney, Agent, or Firm* — Bold IP PLLC; Wooshik Shim; Houda El-Jarrah

(57) ABSTRACT

The present invention is a trailer and a unique custom designed mini dumpster, which provides a solution to the problem of transporting and dumping mini dumpsters. The core components of the invention are a trailer and a dumpster. Generally speaking, the components are configured as follows: the trailer includes a movable holding mechanism for securing and lifting a dumpster and a winching mechanism with a cable. The dumpster includes a horizontal rod, bar, or side trunnion extensions arranged to be secured by the movable holding mechanism and a connection point on the bottom of the dumpster which is arranged to connect with the cable of the winching mechanism to facilitate rotation of the dumpster.

20 Claims, 8 Drawing Sheets

TRAILER AND DUMPSTER

TECHNICAL FIELD

The present invention is a trailer and two or more unique custom designed mini dumpsters, which provides a solution to the problem of transporting and dumping mini dumpsters.

BACKGROUND

Dumpsters are a common way to dispose of trash and debris. Dumpsters are often made of thick metal and hold a large volume of trash. Dumpsters are generally too heavy to be moved by hand. If a dumpster has wheels, the wheels generally are not able to move at high speeds and are not suitable for towing with a vehicle. Accordingly, dumpsters almost universally must be lifted and transported on another vehicle.

In order to move a dumpster, sometimes trailers are used with complex and expensive lifting mechanisms to lift a dumpster onto a trailer bed. Other times, equipment such as a forklift may be used to lift a dumpster onto a flatbed of a truck. However, no equipment currently exists that can lift and either secure for movement or dump a dumpster without a flatbed.

SUMMARY

The disclosed device is unique when compared with other known devices and solutions because it provides a trailer without a flatbed that can lift and secure a mini dumpster and also dump the mini dumpster.

The disclosed device is unique in that it is structurally different from other known devices or solutions. More specifically, the device is unique due to the presence of: (1) a trailer with lifting arms with at least one notch each and a dumpster with extensions configured to fit into the notches such that the lifting arms can lift the dumpster; and (2) a trailer with a winch and cable and a dumpster with an attachment on the bottom of the dumpster configured to connect the cable such that the dumpster can be tilted or rotated by using the winch to dump out contents of the dumpster or be used to secure the dumpster in place for transportation.

DETAILED DESCRIPTION

In the Summary above, in this Detailed Description, the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used—to the extent possible—in combination with and/or in the context of other particular aspects and embodiments of the invention, and in the invention generally.

The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range including that number (which may be a range having an upper limit or no upper limit, depending on the variable being defined). For example, "at least 1" means 1 or more than 1. The term "at most" followed by a number is used herein to denote the end of a range, including that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)—(a second number)," this means a range whose limits include both numbers. For example, "25 to 100" means a range whose lower limit is 25 and upper limit is 100 and includes both 25 and 100.

Figure 1:
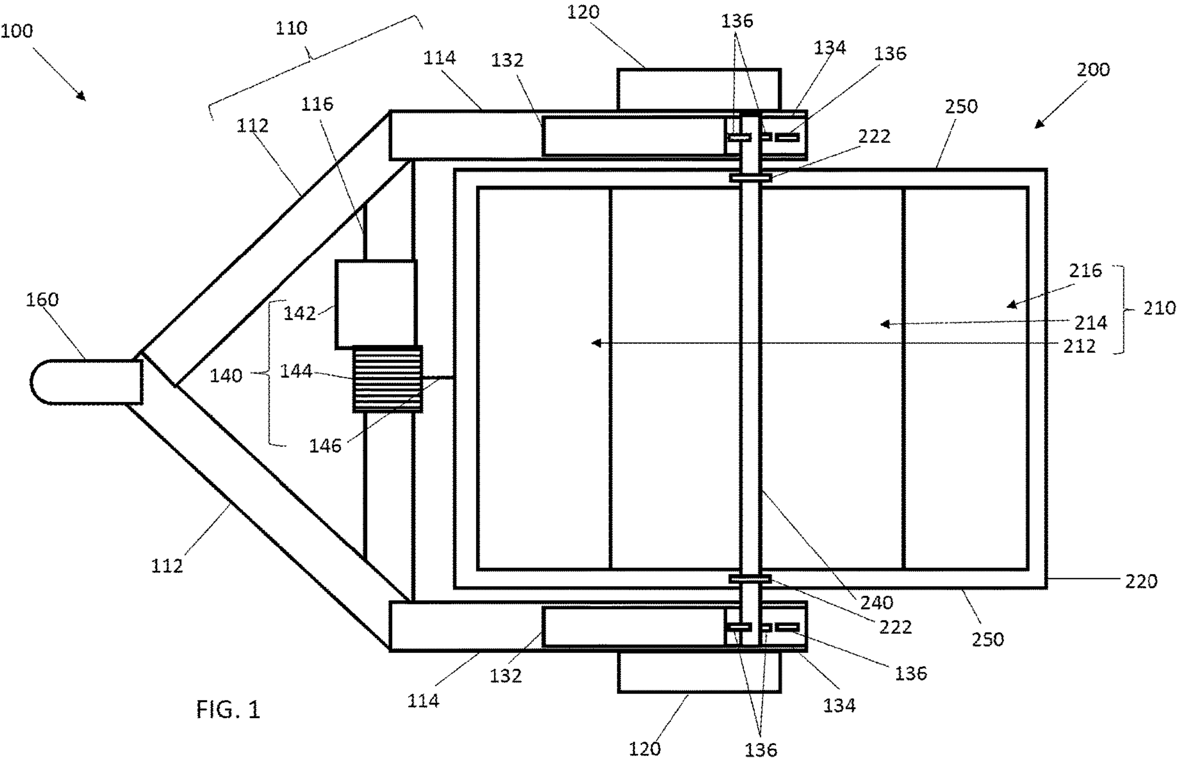
FIG. 1 shows an example top view of a trailer and a first dumpster.

FIG. 1 shows an example top view of a first embodiment of the present invention comprising a trailer 100 and a first dumpster 200. The trailer 100 may include a frame 110, wheels 120, lifting arms 134 and supporting arms 132, winch 140, and hitch 160. The wheels 120 may be road wheels that in combination with the hitch 160 allow the trailer to be towed by a vehicle on roads.

The frame 110 may be made of steel or other durable materials and may include a vehicle-facing frame portion and a dumpster-facing frame portion. The vehicle-facing frame portion is formed to be connected to the rear of a vehicle using a connecting device such as a hitch. The dumpster-facing frame portion is formed to receive and be connected to dumpsters.

Figure 6:
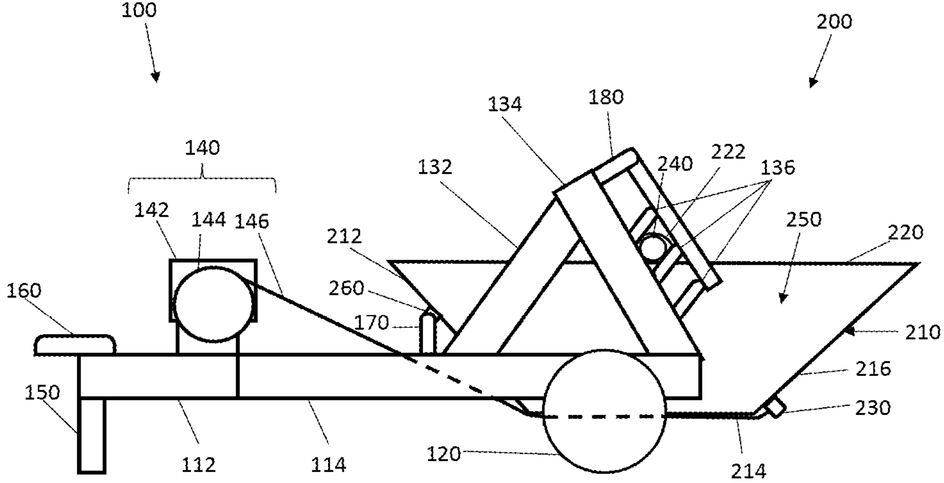
FIG. 6. shows an example side view of the trailer and first dumpster with the first dumpster secured for transportation.

In nonlimiting embodiments, the frame 110 may include two first extensions 112, two second extensions 114, and crossbar 116. In these embodiments, the first extensions 112 form the vehicle-facing frame portion, and the second extensions 114 and the crossbar 116 comprise the dumpster-facing frame portion. The first extensions 112 may join together at an angle at a front of the trailer where the hitch 160 may connect to the frame 110, whereby the hitch 160 is connectable to the rear of a vehicle. The second extensions 114 may be steel beams that extend parallel to each other. The first extensions 112 may connect to the second extensions 114, respectively. The cross bar 116 may extend between the first extensions 112 and/or the second extensions 114 perpendicular to the direction that the second extensions 114 extend. Thus, the second extensions 114 and the cross bar 116 form the dumpster-facing frame portion and may create a bracket shape (i.e., a rectangle with one side missing, thus defining a space to receive dumpsters). Each first extension 112 may have at least one wheel 120 attached. The first extensions 112 and the cross bar 116 may form a triangle and give substantial structural strength and support to the frame 110. The first extensions 112, second extensions 114, and cross bar 116 may be connected by welding, brackets, bolts, or other similar methods of securely fixing materials together. As shown in FIG. 6 and will be described in greater detail below, the frame 110 may also include one or more securing arms 170.

The winch 140 may be attached to the cross bar 116. The winch 140 may include a winch actuator 142, a cable reel 144, and a cable 146. The winch actuator 142 may be a hydraulic actuator, a motor, a hand crank, or other mechanism for rotating the cable reel 144. The cable reel 144 may have a generally cylindrical shape and may be arranged to wind the cable 146 around the cable reel 144. The cable 146 may be a steel cable, rope, chain, or other similar extension of material that can be wound around the cable reel 144 and has sufficient strength and durability to tilt the first dumpster 200. As will be described in greater detail below, the cable 146 may have a hook (not shown) or any other mechanism or device in its end to lockingly connect the cable 146 to a cable connector 230 (shown in FIGS. 3-8).

Each second extension 114 may include a lifting arm 134 and a supporting arm 132. The lifting arms 134 may each include one or more teeth 136 which extend out to form notches (best seen in FIGS. 3-8). The lifting arms 134 may extend up from the second extensions 114 at an angle toward the front of the trailer 100. The supporting arms 132 may extend up from the second extensions 114 at an angle away from the front of the trailer 100 and connect to the lifting arms 134 at an angle to support the lifting arms 134. Each set of the lifting arm 134, supporting arm 132, and second extension 114 may be connected in a variety of ways, for example by welding, brackets, or rotatable connections such as joints. As will be discussed in greater detail below, all or a portion of the lifting arms 134 may be lowered and raised to lift and lower the first dumpster 200, while maintaining the strength to sustain the weight of the first dumpster 200 and any additional weight of waste loaded onto the first dumpster 200.

The triangular structure formed by second extension 114, supporting arm 132 and lifting arm 134 with teeth 136 is exemplary and not limiting. Other structures and apparatus designed to lift, lower, and sustain the first dumpster 200 that are known to a person having ordinary skill in the art may be used. For example, trapezoidal arms may be installed in place of the triangular structure of the second extension 114, the supporting arm 132, and the lifting arm 134.

The trailer 100 may include various other elements which are not shown, such as fenders, axels, struts, shock absorbers, lights, reflectors, electrical connectors, controllers, etc. For example, at the opposite end of the second extensions 114 from the cross bar 116, the second extensions 114 may optionally have fenders or skid plates (not shown), which taper out toward the first dumpster 200 and make the space between the two second extensions 114 span wider. The role of the fenders or skid plates is to reduce damages to the trailer 100 and the first dumpster 200 by smoothly guiding the alignment of the trailer 100 to the first dumpster 200 when a driver backs up the vehicle and trailer 100 toward the first dumpster 200 to fit the first dumpster 200 between the two second extensions 114. The tapering angle of the skid plates may be about 30 degrees (15 degrees on each side), and the skid plates may taper out by about one foot in length. However, any other angle and/or length that is desirable for a smooth fitting of the first dumpster 200 into the frame 110 may be used. The fenders/skid plates may be applicable to other embodiments with other dumpsters such as a second dumpster 300 as described below.

The first dumpster 200 may include bottom 210, sides 250, rim 220, cable connector 230, rod 240, and rod connector 222. The bottom 210 may include in a front bottom portion 212, a middle bottom portion 214, and a rear bottom portion 216. The front bottom portion 212 and the rear bottom portion 216 may be angled away from each other as they extend upward and extend between the sides 250, the rim 220, and the middle bottom portion 214. The middle bottom portion 214 may be substantially flat and level such that the dumpster 200 may rest on the middle bottom portion 214 on the ground. The middle bottom portion 214 may be between the front bottom portion 212 and the rear bottom portion 216. The sides 250 may be vertical or angled and may extend between the front bottom portion 212, the middle bottom portion 214, the rear bottom portion 216, and the rim 220. The rim 220 may be a top of the sides 250, the front bottom portion 212, and the rear bottom portion 216 or may be a separate element attached to the top of the sides 250, the front bottom portion 212, and the rear bottom portion 216.

The rod 240 may be a steel rod or other durable material. The rod 240 may be round in cross section such that rod 240 can rotate when secured in the notches formed by the teeth 136 of the lifting arms 134. The rod 240 may be secured to the rim 220 by the rod connectors 222. The rod connectors 222 may be steel rings, or other forms of connectors. The rod 240 may be able to rotate within the rod connectors 222 or may be fixed to the rod connectors such that rotation is not possible. The rod connectors 222 may include bearings to facilitate easier rotation of the rod 240. The thickness of the rod 220 may depend on the weight and volume of the dumpster 200. In general, the rod 240 should be able to support the weight of the first dumpster 200 with the first dumpster 200 filled with water or any other materials having similar or larger density (specific gravity) without substantially bending. The rod 240 may optionally have stoppers (not shown) around each rod connector 222 such that the rod 240 may not slip, shift, or derail from the rod connectors 222 and the notches formed by the teeth 136 of the lifting arms 134.

As better seen in FIGS. 3-6, the first dumpster 200 may be a skip-style dumpster. In other words, the first dumpster 200 seen from the side has a shape of a trapezium. The convex contour (seen from the rod 240) formed by the front bottom portion 212, the middle bottom portion 214, and the rear bottom portion 216 allows the first dumpster 200 to swivel or rotate around the rod 240 without hitting the ground. However, any other convex contour of the bottom 210 of first dumpster 200 may be used as long as the first dumpster 200 does not hit the ground while swiveling around the rod 240. For example, the bottom 210 may comprise a round-shaped portions in place of the front bottom portion 212 and the rear bottom portion 216 such that the contour formed by the front bottom portion 212, the middle bottom portion 214, and the rear bottom portion 216 looks more like an arc with its center portion cut flat.

Cable connector 230 may be connected to the bottom 210 of the first dumpster 200. The cable connector 230 may be a steel ring welded to the bottom 210 of the first dumpster 200 at the front bottom portion 212. In other embodiments the cable connector 230 may be connected to the rim 220 above the front bottom portion 212 or to the middle bottom portion 214 or to the rear bottom portion 216. More generally, the cable connector 230 should be placed to facilitate the rotation of the first dumpster 200 around the rod 240 when the cable 146 connected to the cable connector 230 pulls the side of the first dumpster 200.

As will be described in greater detail below, the trailer 100 may lift and primarily secure the first dumpster 200 by the rod 240 being secured and lifted in the notches formed by the teeth 136 of the lifting arm 134. The first dumpster 200 may also be secured by the cable 146 connected to the cable connector 230. As shown in FIG. 6 and will be described in greater detail below, the first dumpster 200 may also be secured by one or more locks 180 and one or more securing arms 170.

The first dumpster 200 may also be rotated by the cable 146 pulling on the cable connector 230. In this way, the contents of the first dumpster 200 may be dumped out or assisted with dumping out. The cable connector 230 may be attached at or near the middle point between the sides 250.

Figure 2:
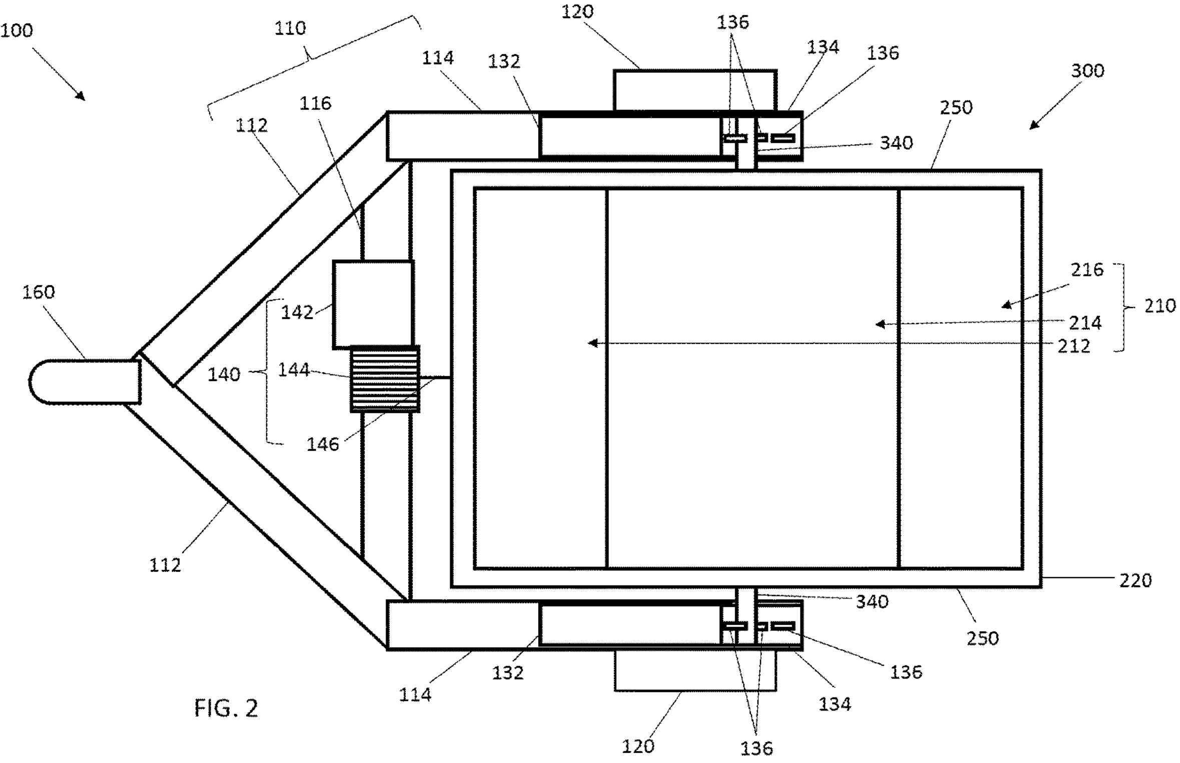
FIG. 2 shows an example top view of the trailer and a second dumpster.

FIG. 2 shows an example top view of a second embodiment of the present invention comprising the trailer 100 and a second dumpster 300. The second dumpster 300 may be substantially the same as the first dumpster 200 except that the second dumpster 300 may be taller than the first dumpster 200 and instead of a rod 240 and rod connector 222 of the first dumpster 200 includes two side extensions or trunnions 340 extending from each side of the second dumpster 300. The trunnions 340 may include a generally cylindrical portion arranged to fit in the notch formed by the teeth 136 of the lifting arm 134 such that the second dumpster 200 may be lifted and secured by the lifting arms 134. The side extensions or trunnions 340 of FIG. 2 and the rod 240 of FIG. 1 may collectively be referred to as horizontal extensions.

The second dumpster 300 with trunnions 340 provides an open top space unhindered by a rod 240 or a bar, thereby allowing wastes with tall sizes may be more easily loaded. On the other hand, the first dumpster 200 of the first embodiment of the present invention shown in FIG. 1 can be made relatively taller (or deeper) compared to that of the second dumpster 300, thereby compensating for the hindrance in the top space by the rod 240. In addition, the rod 240 is usually rated to withstand larger weight of waste compared to the trunnions 340. For these reasons, the first dumpster 200 and the second dumpster 300 may interchangeably be used to load and carry different kinds of waste. For example, dense waste such as liquid, dirt, and concrete may better fit in the first dumpster 200, and large (tall) but relatively less dense waste may better fit in the second dumpster 300.

Figure 3:
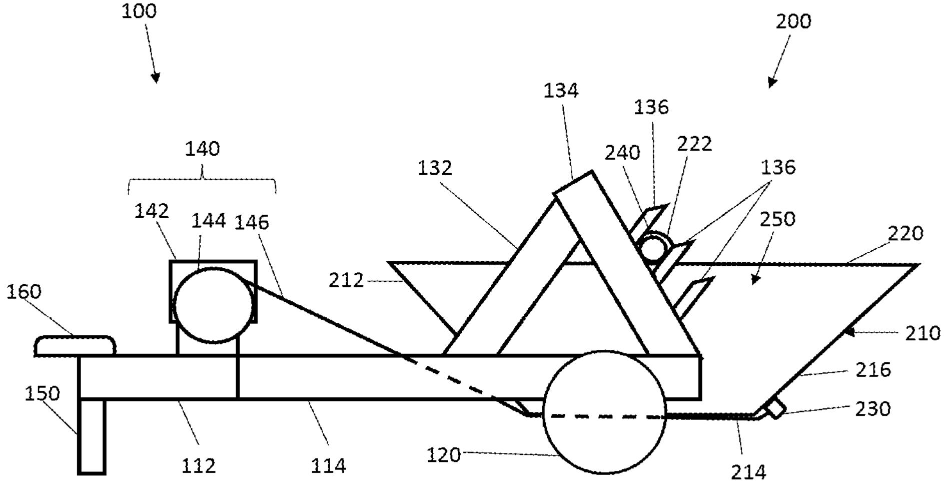
FIG. 3 shows an example side view of the trailer and the first dumpster with the first dumpster lifted off the ground.

FIG. 3 shows an example side view of the first embodiment of the present invention including the trailer 100 and the first dumpster 200 with the first dumpster 200 lifted off the ground. Note the distance between the ground (bottom of the wheel 120) and the middle bottom portion 214 of the bottom 210 of the first dumpster 200. The trailer 100 may also include a stand 150 for maintaining the front of the trailer frame 110 up off the ground when the hitch 160 is not attached to a vehicle. The stand 150 may be removable or foldable so that the stand 150 does not interfere with the trailer's ability to move on roads when attached to a vehicle. The cable 146 may be attached to the cable connector 230 of the first dumpster 200 by passing under the bottom 210 of the first dumpster 200. Portions of the cable 146 are shown in dotted lines to show that it is behind other elements. The cable 146 stretches with substantial tension from the cable reel 144 to the cable connector 230 such that the cable does not sag below the bottom 210 of the first dumpster 200. The round cross section of the rod 240 is shown. As previously described, the rod 240 may include stoppers (not shown to not obscure the cross section of the rod 240). The stoppers may be attachments or extensions from the rod 240 that prevent the rod from shifting (in the direction of into and out of the page in the perspective of FIG. 3) and falling out of the notches formed by the teeth 136 of the lifting arms 134.

Figure 4:
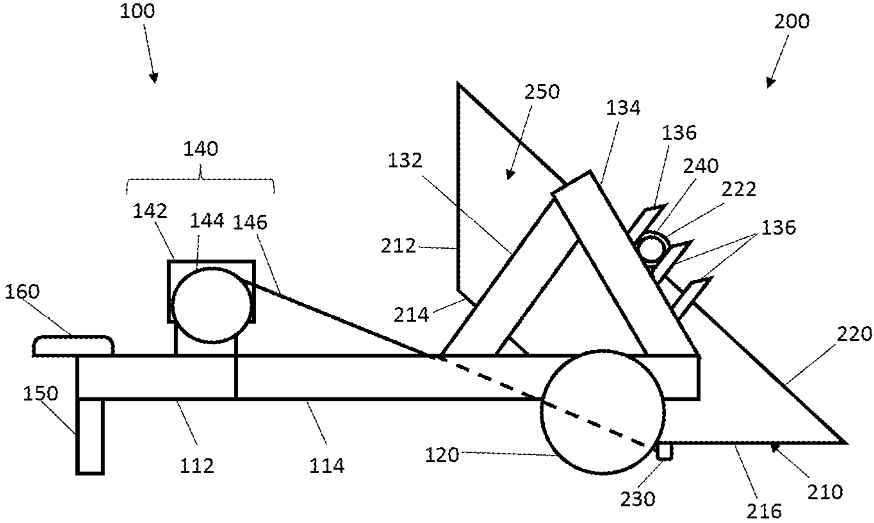
FIG. 4 shows an example side view of the trailer and the first dumpster with the first dumpster tilted to dump the contents of the first dumpster.

FIG. 4 shows an example side view of the first embodiment of the present invention including the trailer 100 and the first dumpster 200 with the first dumpster 200 tilted to dump the contents of the first dumpster 200. A user of the trailer may activate or use the winch actuator 142 to cause the cable 146 to pull on the first dumpster 200. The force will cause the first dumpster 200 to rotate around the axis of symmetry of the rod 240. Depending on the height of the first dumpster 200, the height of the notch in the lifting arm 134 formed by the teeth 136 and the angle of the front bottom portion 212, the first dumpster 200 may be rotated to varying degrees. However, it is desirable for the first dumpster 200 to be able to rotate enough that the rear bottom portion 216 is at least parallel to the ground (i.e., flat ground under the wheels 120 of the trailer). It may also be desirable for the rear bottom portion 216 to be able to rotate sufficiently that all contents of the dumpster will be dumped out without any additional force or assistance than the rotation of the first dumpster 200. This is normally achieved by the rear bottom portion 216 being at an angle of at least negative 30 degrees. When the user activates or uses the winch actuator 142 backwards to release the cable 146, the first dumpster 200 rotates backwards by its rotational inertia around the axis of symmetry of the rod 240 and returns back to the upright position as shown in FIG. 3.

Figure 5:
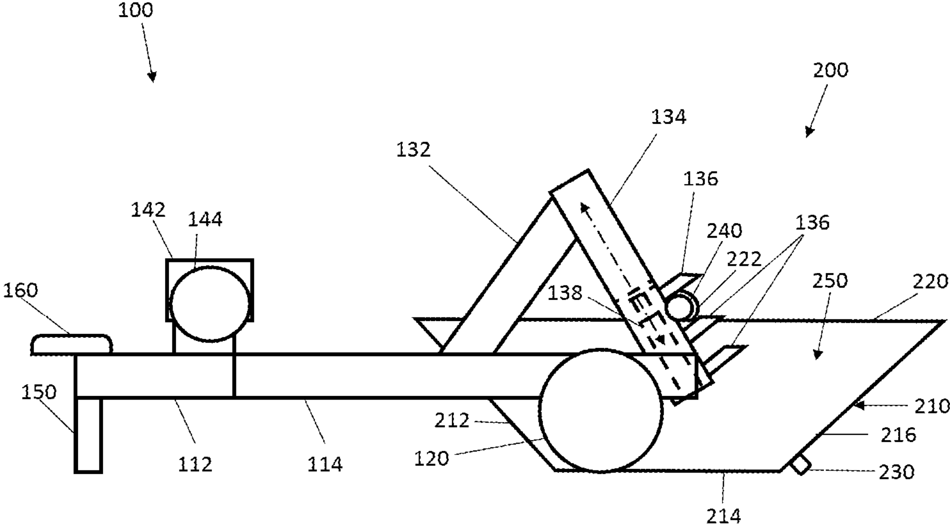
FIG. 5 shows an example side view of the trailer and the first dumpster with the first dumpster on the ground and lifting arms of the trailer lowered.

FIG. 5 shows an example side view of the first embodiment of the present invention including the trailer 100 and the first dumpster 200 with the first dumpster 200 on the ground and lifting arms 134 of the trailer lowered. The lifting arms 134 or a portion of the lifting arms 134 may be lower and raised by one or more lifting arm actuators 138 (hidden behind the lifting arm 134 and shown in dashed line). As shown, the lifting arm actuator 138 may be inside the lifting arm 134 and cause the teeth 136 of the lifting arm 134 to be raised and lowered. The lifting arm actuator 138 may be a hydraulic piston. In other embodiments, lifting arm actuator 138 may be a mechanical lifting mechanism with an electric motor or hand crank.

In order to lift the first dumpster 200 (or the second dumpster 300), the lifting arm 134 or a portion of the lifting arm 134 may be lowered. The trailer 100 may then be moved into a position (normally by backing a vehicle with the trailer 100 attached into position) such that the rod 240 (or side extensions or trunnions 340 for the second dumpster 300) is in or above one of the notches formed by the teeth 136. Then the lifting arm actuator 138 may be actuated to lift the lifting arm 134 or portion of the lifting arm 134 with the first dumpster 200 by the rod 240 (or the second dumpster 300 by the side extensions/trunnions 340). The rod 240 (or side extensions/trunnions 340) should be positioned near the middle of the first dumpster 200 (or the second dumpster 300) from front to back and the load in the dumpster should be relatively balanced such that when the dumpster 200 is lifted, the dumpster does not rotate forward or backward significantly. After the first dumpster 200 (or the second dumpster 300) is lifted, the cable 146 may be connected to the cable connector 230 to provide control over the rotation of the dumpster 200 at least in the clockwise direction (from the perspective of FIG. 5). Methods of preventing the dumpster 200 from rotating in the counterclockwise direction will be discussed in greater detail below.

To facilitate loading and lifting the first dumpster 200 or the second dumpster 300, in some nonlimiting embodiments, each of the second extension 114 of the frame 110 and the lifting arm 134 may be rotatably connected (not shown) and the entire lifting arm 134 may be lowered by pivoting out the lifting arm 134 away from the supporting arm 132 by the lift arm actuator 138 with the angle of the connection between the lifting arm 134 and the second extension 114 changing to accommodate the movement of the lifting arm 134.

Alternatively, in some other nonlimiting embodiments, each of the second extension 114 of the frame 110 and the supporting arm 132 may be rotatably connected (not shown), the other end of the supporting arm 132 and the lifting arm 134 rotatably connected (not shown), and the other end of the lifting arm 134 is slidably connected to the second extension 114 of the frame. In this configuration, when loading a dumpster 200, 300, the supporting arms 132 are pivoted out toward the back of the trailer 100, thereby the lifting arms 134 also extend toward the back of the trailer 100, stretching the supporting arms 132 and the lifting arms 134 toward the first dumpster 200 or the second dumpster 300, and the height of the teeth 136 is lowered. The rotational movement may be actuated by an actuation mechanism similar to the lift arm actuator 138 or anything well known in the art. Other example configurations of loading and lifting the first dumpster 200 or the second dumpster 300 onto the trailer 100 known to a person having ordinary skill in the art are also possible.

The lifting arm 134 may include multiple teeth 136 forming multiple notches at different heights so dumpsters of various heights (e.g., rods 240 or side extensions/trunnions 340 of various heights) may be used with the trailer 100.

FIG. 6 shows an example side view of the first embodiment of the present invention including the trailer 100 and first dumpster 200 with the first dumpster 200 secured for transportation. The trailer 100 may additionally include a lock 180 and one or more securing arms 170. In nonlimiting embodiments, only one securing arm 170 may be attached to one of the second extensions 114 of the frame 110. Alternatively, each of two securing arms 170 may be attached to one of the second extensions 114 of the frame 110. Still alternatively, one securing arm 170 may be attached to the cross bar 116 of the frame 110. The first dumpster 200 may include a securing arm connector 260 on the front bottom portion 212 for receiving each securing arm 170. The securing arm 170 may be configured to prevent the dumpster 200 from rotating clockwise and counterclockwise (from the perspective of FIG. 6). The securing arm 170 may be a cable, chain, rope, bar, bungie, or other form of durable material that can be used to connect the front bottom portion 212 of the bottom 210 of the first dumpster 200 to the frame 110 of the trailer 100. The securing arm connector 260 may be a hollow socket that receives a pin (not shown) connecting one end of the securing arm 170 with the securing arm connector 260, but any other securing mechanism known in the art may be used.

The lock 180 may be a bar, pin, chain, plate, latch or other durable material used to close the notch formed by the teeth 136 of the lifting arm 134. The lock 180 may prevent the rod 240 (or side extensions/trunnions 340 for the second dumpster 300) from derailing from the notch formed by teeth 136 when the trailer 100 goes over a bump in the road or experiences another similar jolt.

Other ways (not shown) of securing the first dumpster 200 may include securing rods or beams slid through holes placed in the frame 110 under the first dumpster 200 (or the second dumpster 300) after the first dumpster 200 is raised, cables or bungies securing the rim 220 of the first dumpster 200 to the frame 110 of the trailer 100, and a securing rod placed through holes in the supporting arms 132 above the first dumpster 200. These securing mechanisms are equally applicable to the second embodiment of the present invention including the second dumpster 300.

Figure 7:
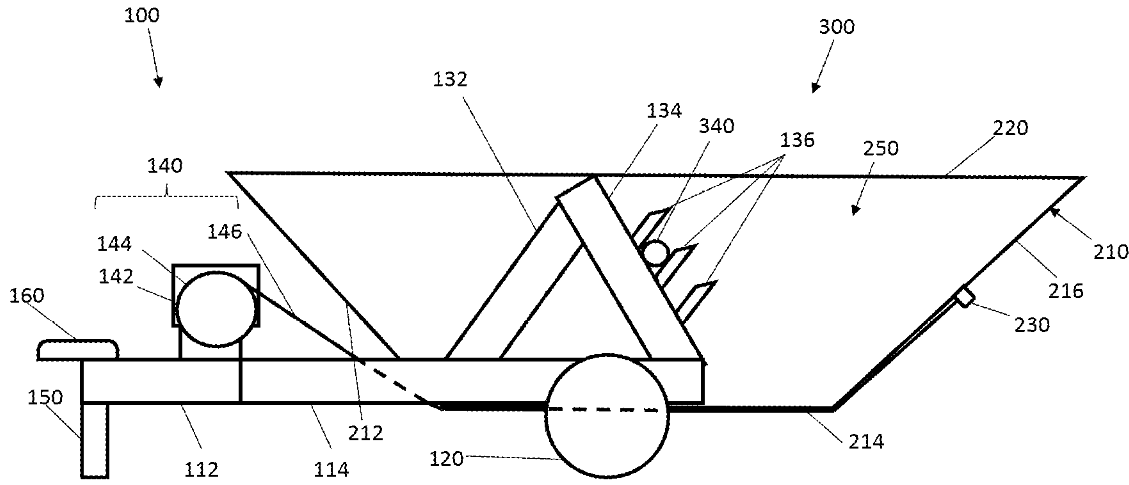
FIG. 7 shows an example side view of the trailer and second dumpster with the second dumpster lifted off the ground.

FIG. 7 shows an example side view of the second embodiment of the present invention including the trailer 100 and the second dumpster 300 with the second dumpster 300 lifted off the ground. The side extensions/trunnions 340 may be welded (or otherwise affixed) to and extend from sides 250 of the second dumpster 300. This allows the second dumpster 300 to extend above the side extensions/trunnions 340 and thus to be able to be taller than would be possible with the rod 240. The side extensions/trunnions 340 should be above the center of gravity of the second dumpster 300 (both when empty and when loaded) to prevent an unstable system that is likely to significantly rotate or flip (and likely dump out the contents of the second dumpster 300) when lifted. Due to the greater height of the second dumpster 300, the area of the second dumpster 300 may be greater than the area of the first dumpster 200. The cable 146 may be secured to the second dumpster 300 in the same manner as the first dumpster 200. The second dumpster 300 may be lifted and secured in the same manner as the first dumpster 200 as well.

Figure 8:
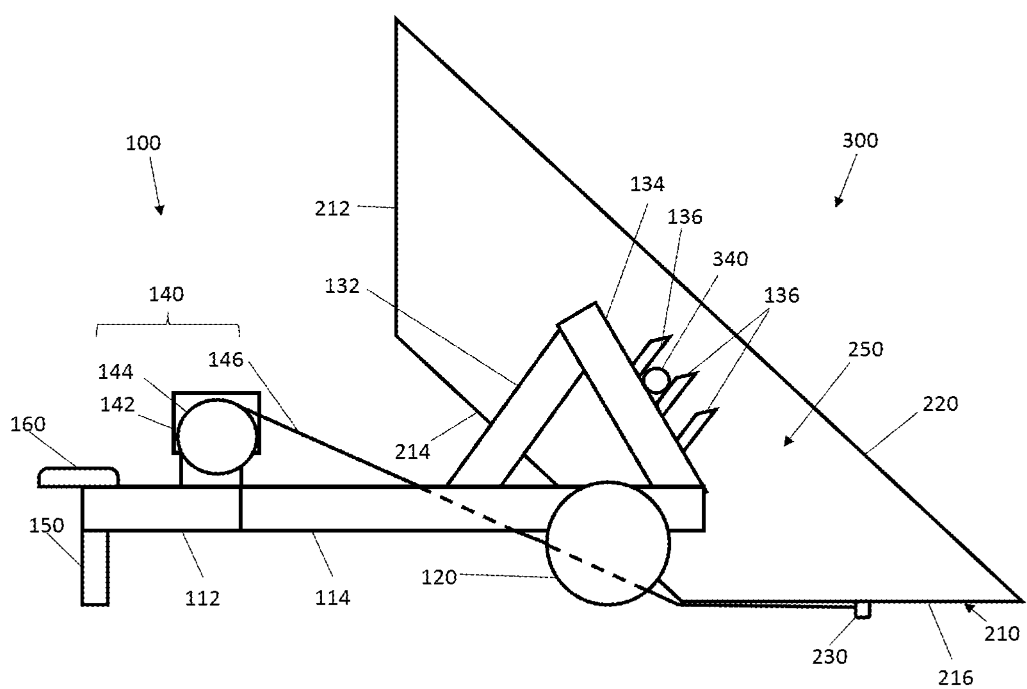
FIG. 8 shows an example side view of the trailer and second dumpster with the second dumpster tilted to dump the contents of the second dumpster.

FIG. 8 shows an example side view of the second embodiment of the present invention including the trailer 100 and the second dumpster 300 with the second dumpster 300 tilted to dump the contents of the second dumpster 300. The second dumpster 300 may be tilted in the same manner as the first dumpster 200 using the cable 146.

Advantageously, the trailer 100 allows the dumpster 200, 300 to be delivered, picked up, and dumped without heavy equipment. The trailer 100 with the dumpster can be hauled by most pickup trucks or other consumer vehicles. Furthermore, dumpsters (for example but not limited to first dumpster 200 or second dumpster 300) of various sizes can be hauled by a single trailer 100.

Accordingly, the present description provides for various embodiments for a trailer and dumpster. Many uses and advantages are offered by the trailer and dumpster as described above in one or more non-limiting embodiments in the present description.

The corresponding structures, materials, acts, and equivalents of any means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention, according to one or more embodiments described in the present description, may be practiced with modification and alteration within the spirit and scope of the appended claims. Thus, the description is to be regarded as illustrative instead of restrictive of the present invention.

What is claimed is:

1. A system comprising:

a trailer comprising a frame, a lifting arm connected to the frame and having one or more notches, a winch connected to the frame, and a plurality of wheels; and a dumpster comprising a left side, a right side, a bottom, a cable connector and a horizontal extension, wherein the frame comprises a vehicle-facing frame portion and a dumpster-facing frame portion, the dumpster-facing frame portion arranged to receive the dumpster, the bottom has a substantially convex contour seen from the horizontal extension, the one or more notches are arranged to receive and rotatably sustain the horizontal extension, the lifting arm is arranged to vertically move the one or more notches, capable of making the dumpster swing around the horizontal extension above ground, and the winch includes a cable arranged to extend and pass under the bottom of the dumpster and be connected to the cable connector.

2. The system of claim 1, wherein the bottom of the dumpster has a middle bottom portion that is substantially flat.

3. The system of claim 2, wherein the bottom further has a front bottom portion adjacent to the middle bottom portion, and a rear bottom portion adjacent to the middle bottom portion and opposite to the front bottom portion.

4. The system of claim 3, wherein the substantially convex contour of the bottom is trapezoidal.

5. The system of claim 1, wherein the trailer further comprising one or more teeth, wherein the one or more teeth define the one or more notches.

6. The system of claim 1, wherein the horizontal extension is a rod, the dumpster further includes a rim above the left side and the right side and the bottom of the dumpster, and the rod passes over the rim of the dumpster.

7. The system of claim 6, wherein the rim includes two or more rod connectors, and the rod is connected to the two or more rod connectors.

8. The system of claim 1 wherein the horizontal extension is a left side extension and a right side extension, the left side extension outwardly extending from the left side of the dumpster at a horizontal extension height, the right side extension outwardly extending from the right side of the dumpster at the horizontal extension height, and the horizontal extension height being above a center of gravity of the dumpster.

9. The system of claim 1, wherein the dumpster-facing frame portion further includes fenders that taper out.

10. The system of claim 1, wherein the winch further includes a winch actuator and a cable reel, the winch actuator and the cable reel arranged to pull and release the cable.

11. The system of claim 1, wherein the winch actuator is hydraulic, electric, or manual.

12. The system of claim 1, wherein the frame further includes a cross bar, and the winch is connected to the cross bar.

13. The system of claim 1, wherein the cable includes a hook, and a connection between the cable and the cable connector is made by the hook.

14. The system of claim 1, wherein the vehicle-facing frame portion includes a hitch.

15. The system of claim 1, wherein the vehicle-facing frame portion includes a stand.

16. The system of claim 1, wherein the frame further includes a supporting arm on the dumpster-facing frame portion and connected to the lifting arm.

17. The system of claim 16, wherein the supporting arm and the lifting arm are moveably connected to the dumpster-facing frame portion.

18. The system of claim 1, wherein the lifting arm includes a lock arranged to cover the one or more notches and prevent the horizontal extension from escaping the one or more notches.

19. The system of claim 1, wherein the frame further includes a securing arm arranged to be connected between the frame and the bottom of the dumpster.

20. The system of claim 1, wherein the rod further includes two or more stoppers arranged to prevent the horizontal extension from shifting and escaping the one or more notches.

* * * * *